United States Patent [19]

Doin et al.

[11] 4,053,119
[45] Oct. 11, 1977

[54] WINDING DEVICE PARTICULARLY USEFUL IN CONNECTION WITH VEHICLE SAFETY BELTS

[75] Inventors: Bernard J. Doin, Saint Medard en Jalles; Jean-Francois Tillac, Bordeaux Cauderan, both of France

[73] Assignee: Societe Nationale des Poudres et Explosifs, France

[21] Appl. No.: 747,402

[22] Filed: Dec. 3, 1976

[30] Foreign Application Priority Data

Dec. 31, 1975 France .............................. 75.40206

[51] Int. Cl.² ......................................... B65H 75/48
[52] U.S. Cl. ..................... 242/107.4 R; 242/107.4 A; 244/122 B
[58] Field of Search .............. 242/107.4 A, 107.4 R, 242/107.4 B; 244/122 R, 122 B; 297/388; 280/744–747

[56] References Cited

U.S. PATENT DOCUMENTS

| | | | |
|---|---|---|---|
| 3,077,324 | 2/1963 | Strickland | 242/107.4 B X |
| 3,531,061 | 9/1970 | Davies | 242/107.4 B |
| 3,970,266 | 7/1976 | Doin | 242/107.4 B |
| 3,984,127 | 10/1976 | Bendler | 242/107.4 R |

Primary Examiner—Edward J. McCarthy
Attorney, Agent, or Firm—Bucknam and Archer

[57] ABSTRACT

The device for winding up an elongate flexible element, such as a vehicle safety belt of U.S. Pat. No. 3,970,266 comprises a casing, an axle mounted in the casing and rotationally fast therewith, a hollow winding-drum rotatably mounted in the casing coaxial with and surrounding the axle, an annular piston positioned between the drum and axle and axially movable relative thereto between initial and final positions, an annular pressure chamber defined within the drum by piston, a pyrotechnic charge for pressurizing the pressure chamber with combustion gases therefrom to propel the piston axially along said drum and axle from the initial position to the final position, first cooperable guide means on the piston and the drum, and second cooperable guide means on the piston and the axle and is improved by providing an annular piston which is formed by two annular half-pistons, one of the half-pistons cooperates through the first guide means with the drum, the other of the half-pistons cooperating through the second guide means with the shaft, and the half-pistons have means for interconnecting the half-pistons to move together. The interconnecting means is constituted by substantially radial teeth formed on the opposed faces of the half-pistons. A restraining mechanism is interposed between the drum and the shaft for opposing rotation of the drum relative to the shaft.

10 Claims, 8 Drawing Figures

WINDING DEVICE PARTICULARLY USEFUL IN CONNECTION WITH VEHICLE SAFETY BELTS

This invention relates to a device for winding up an elongate flexible element, such as a vehicle safety belt.

In the specification of United States Ser. No. 564,730 which has now issued as U.S. Pat. No. 3,970,266 there is described a device for winding up a vehicle safety belt, comprising a casing, an axle mounted in the casing and rotationally fast therewith, a hollow winding-drum rotatably mounted in the casing coaxial with and surrounding said axle, an annular piston positioned between the drum and axle and axially movable relative thereto between initial and final positions, an annular pressure chamber defined within the drum by said piston in said initial position thereof, a pyrotechnic charge for pressurising the pressure chamber with combustion gases therefrom to propel the piston axially along the drum and axle from the initial position, to the final position, first cooperable guide means on the piston and the drum, and second cooperable guide means on the piston and the axle, the first and second guide means being so arranged that the piston is rotationally fast with one of the drum and axle, and is movable along a helicoidal path relative to the other of the drum and axle, whereby axial displacement of the piston by the combustion gases causes the drum to be rotated for winding the flexible element on to said drum.

The device includes a clutch system which permits free rotation of the winding drum without axial displacement of the annular piston. Engagement of this clutch is achieved by interruption of at least one of the guide means near the initial position of the piston. This clutch system enables the belt, secured to the winding drum, to be wound, but it suffers from some secondary drawbacks due to the difficulty in engagement in certain positions of the annular piston relative to the central shaft. This is especially so when the second guide means comprises a plurality of helicoidal grooves in the shaft, but the shaft has only a limited number of helicoidal grooves formed therein. Furthermore, depending upon the position of the annular piston relative to the central shaft, the annular piston has to execute a more or less great initial linear movement before engaging with the helicoidal grooves, and this results in a mode of operation that is not strictly repetitive.

The above device also has a retaining mechanism which permits relative rotation of the drum and casing in only one direction or opposes said relative rotation in at least one direction so that, for example, after the safety belt has been wound on to the drum, the belt can be unwound with the dissipation of considerable energy, so as to deaden the shock suffered by the person to be protected. The retaining mechanism is fitted between the winding drum and the casing of the winding device, and this requires the use of a mechanism of considerable dimensions and leads to resistance to winding which serves no purpose in the case where the mechanism comprises two crown wheels having radial ribs of sawtooth cross-section.

The object of the present invention is to provide a winding up device having on the one hand a clutch system which responds very rapidly and in a repetitive manner, and on the other hand, a retaining mechanism of small dimensions which offers no resistance when the belt is being wound on to the drum.

According to one aspect of the invention the annular piston is formed by two annular half-pistons, one of the half-pistons cooperating through said first guide means with the drum and the other half-piston cooperating through the second guide means with the shaft, the two half-pistons being provided with means for interconnecting them to move together.

The main purpose in providing a piston in the form of two annular half-pistons is to form a clutch system wherein the interconnecting means operates only temporarily when the pyrotechnic charge is ignited, the winding drum thus being able to rotate initially before ignition of the charge without the annular half-pistons being displaced longitudinally.

More particularly, the interconnecting means may comprise substantially radial teeth formed on opposed faces of the half-pistons which move into contact when the pyrotechnical charge is ignited, but said interconnecting means may be formed in a different manner and may be constituted, for example, either by cylindroconical lugs extending into recesses of complementary shape which are disposed tangentially, or directly by the faces of the half-pistons that are in contact, these two faces being roughened sufficiently to enable them to adhere to each other.

In accordance with a second aspect of the present invention, a winding-up device is provided with a restraining mechanism, for opposing rotation of the drum relative to the shaft in a direction to unwind the flexible element therefrom and to move the piston from the final position to the initial position thereof, after the charge has been ignited, the retaining mechanism being interposed between the winding drum and the shaft. When the unwinding tension applied to the belt is low, the retaining or stop mechanism can cause a total blocking, preventing the return of the drum to its initial position.

In particular, the stop mechanism comprises at least one wedging element, which penetrates to a predetermined extent into a portion fast with the winding drum or the central shaft. The wedging elements are preferably balls having very high mechanical strength, but they may also take the form of wedges each provided with a penetrating projection capable of forming a groove in the portion fast with the drum or shaft, either by deforming this portion as would a ball, or by removing chips, the projection acting as a cutting tool.

To provide a greater shock-absorbing stroke when the stop mechanism comprises more than one wedging element, it is particularly advantageous to stagger them longitudinally so that each element forms an independent circular groove which may extend completely around the portion fast with the drum or shaft.

In a particular embodiment which enables the dimensions of the winding device to be reduced, at least one of the first and second guide means comprises at least one groove, longitudinal or helicoidal, housing a wedging element.

The first guide means preferably comprises at least two linear keying grooves in the interior surface of the drum, into which grooves wedging elements are held to be staggered longitudinally, by at least one locating element which extends into said linear grooves. It is particularly advantageous if the grooves each have a flat bottom and a part cooperable with the associated wedging element which is asymmetrical in relation to the axial plane perpendicular to the floor, so that the wedging element can be moved between a disengaged position and a wedging position, depending upon the direction of rotation of the winding drum.

In a modified construction, the portion fast with the drum or shaft and which the wedging elements penetrate to a predetermined depth, is a ring which is made of a deformable material, the dimensions and mechanical strength properties of the ring being selected in dependence upon the required efficiency of the stopping action.

The invention is described in detail below, by way of example, with reference to the accompanying drawings, in which.

Figure 1:
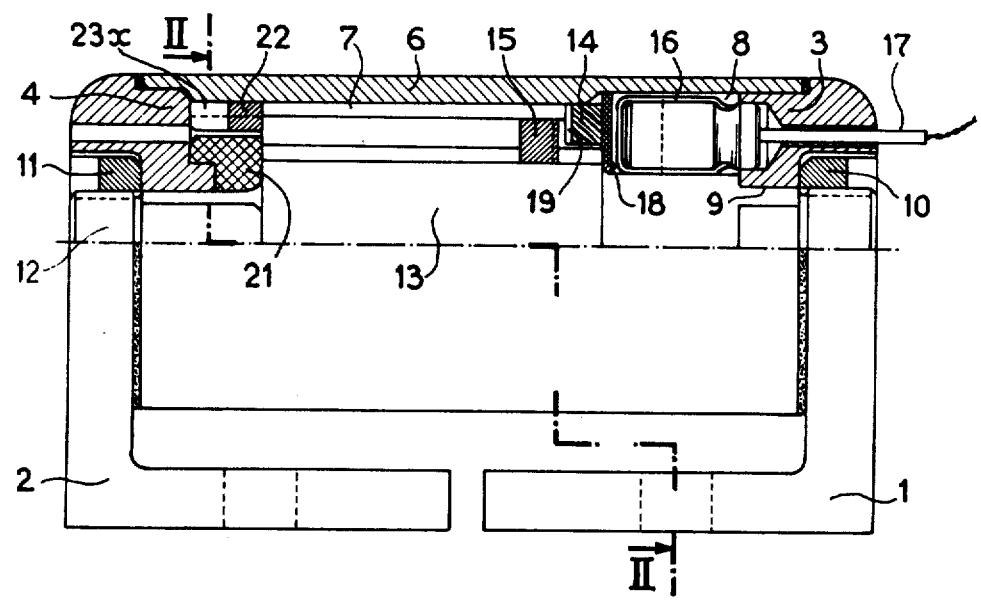
FIG. 1 is a longitudinal half-section on the axis of a winding device for a vehicle safety belt.
Figure 2:
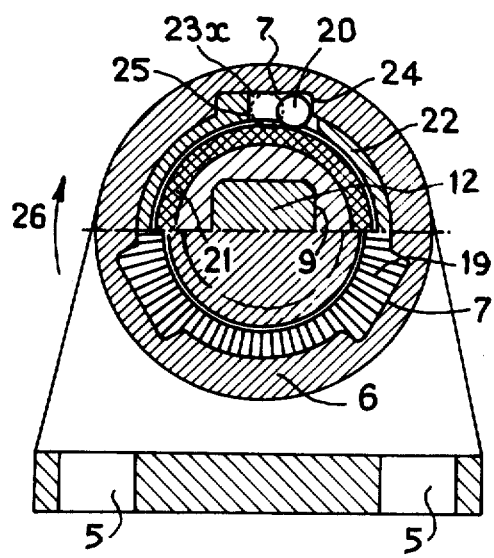
FIG. 2 is a section taken on the line II—II of FIG. 1.

Referring to FIGS. 1 and 2, the winding device is housed in a casing, of which are shown only two angled elements 1 and 2 which comprise interior centering bosses 3 and 4 and holes 5 in the base, to enable them to be secured to the bodywork of the vehicle, for example to the upper portion of the upright separating the front and rear doors. The winding drum 6 is mounted on the two bosses 3 and 4, and its bore is provided with three linear keying grooves 7 which run into a chamber 8 formed at that end of the drum separated at the upstream side of the winding device, this upstream side corresponding to the angled element 1. The interior bosses 3 and 4 on the angled elements are each traversed by a slot 9 of square section which extends into an outer cavity, the base of which forms a bearing for clamping nuts 10 and 11, which, in combination with the slots, immobilize the central shaft 12. At its median portion 13, this shaft is provided with a treble-thread screw, the pitch of which is slightly less than the length of this median portion 13 to allow for the thickness of the annular piston which executes a complete revolution when it reaches the downstream end of the median portion of the screw. The annular piston is formed by two half-pistons 14 and 15, the upstream half-piston 14 having three peripheral bosses which slide, without clearance, in the three linear grooves 7 in the winding drum, whereas its inner surface is a cylinder having a diameter slightly greater than the outside diameter of the median portion 13 of the central shaft, the downstream half-piston 15 being provided with three helicoidal grooves which engage, without clearance, with the three screw-threads on the central shaft. The pyrotechnical charge which forms the gas that drives the piston comprises two electric ignition devices disposed in contact with 2.1 grammes of ignition powder consisting mainly of zirconium and barium chromate, the charge cartridge 16 containing 1.8 grammes of a powder based on nitrocellulose. The electric ignition devices are connected to a collision-detecting system by means of a conductor 17 which is provided with an air-tight bush whereby it extends through the angled member 1 of the casing. A flexible joint 18 is secured to the upstream face of the piston, and this joint enables the upstream half-piston 14 to be positioned longitudinally, the downstream face of this piston being provided with radial teeth 19 which are able to engage with the radial teeth on the upstream face of the downstream half-piston 15; these two sets of teeth form a direct-drive dog clutch which enables the two half-pistons to be engaged and temporarily interconnected for rotation.

Figure 3:
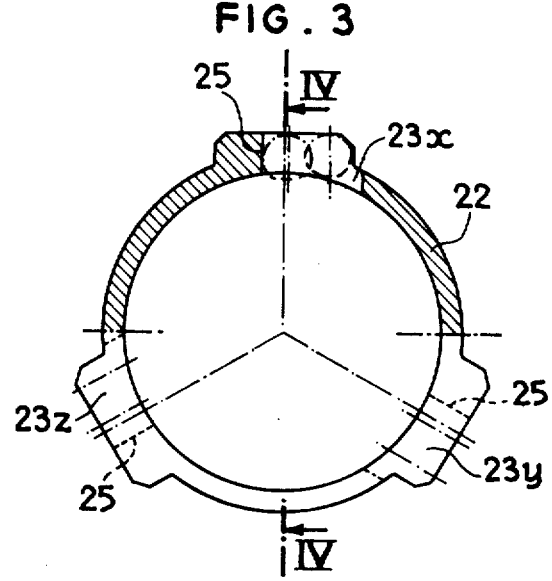
FIG. 3 is a half-sectional detail view of a single locating element for the three wedging elements.
Figure 4:
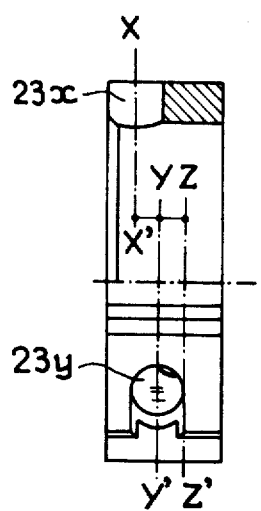
FIG. 4 is a half-section on line IV—IV through the locating element illustrated in FIG. 3.
Figure 5A:
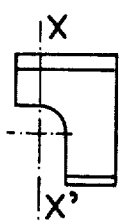
FIG. 5 shows at 5a, 5b and 5c, developed views of the three locating elements, while 5d is a side view from the left of the element shown in detail at 5c.
Figure 5B:
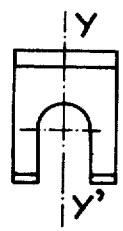
Figure 5C:
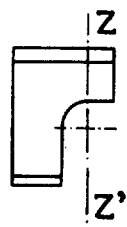
Figure 5D:

The stop mechanism of the winding device illustrated in FIGS. 1 and 2 is constituted by three balls 20 of very high mechanical strength, such as ball-bearing balls which are disposed towards the downstream end of the three linear grooves 7 and which bear on an integral portion of the central shaft 13, this portion being a shouldered mild steel ring 21 having a square axial slot; said balls are staggered longitudinally by a locating element 22, illustrated in detail in FIGS. 3 and 4. The three balls are arranged diametrically along the axes $x'x$, $y'y$ and $z'z$ in the three seats 23x, 23y and 23z. The seats are such that the useful zone of the flat floors of the grooves 7 is asymmetric in relation to the axial plane perpendicular to each floor, and this permits, on the one hand, free rotation of the balls when they bear on the sides 24 of the grooves 7, and on the other hand, penetration of these balls into the shouldered ring 21 when they bear on the sides 25 of the three seats in the locating element. FIG. 5 shows a modified arrangement for locating the balls 20, the three locating elements illustrated in the views numbered 5a, 5b and 5c being simple wedges, which rotate with the drum 6 with the help of the linear grooves 7, each of these wedges having a different type of slot to enable them to be located longitudinally on the axes $x'x$, $y'y$ and $z'z$.

When operating in the normal manner, the winding drum 6 can rotate freely in both directions and entrains the upstream half-piston 14 and the locating element 22, though the speed of rotation of the drum in the direction indicated by the arrow 26 in FIG. 2 must always be low so as not to apply the balls 20 to the sides 25 of the locating element; this would cause blockage of the rotation of the drum unless the seats 23x, 23y and 23z are provided with a very weak spring, constituted for example by a foamed plastics material, so as to keep the balls in contact with the sides 24 of the linear grooves 7 in the winding drum.

In the event of sudden deceleration of the vehicle fitted with the above-described winding device which comprises a drum, the bore of which has a diameter of 30 mm, a collision detector, for example an inertia detector, produces and electric impulse in the conductor 17, and this impulse causes ignition of the pyrotechnical charge contained in the cartridge 16. The gas pressure set up is in the order of 280 bars, and this pressure drives the upstream half-piston 14 against the downstream half-piston 15, and the radial teeth on the half-pistons engage and temporarily interconnect the two half-pistons so that they rotate together. Downstream displacement of the annular piston is accompanied by rotation of the piston which becomes screwed on to the screw-threads on the median portion 13 of the central shaft so that the latter is prevented from rotating further, and the winding drum is then driven in rotation in the direction opposite to that indicated by the arrow 26 in FIG. 2. The delay between the moment when the electrical impulse is produced and the moment at which the winding drum has executed one revolution when the piston strikes the shouldered ring 21 is in the order of 9 milliseconds, and the tangential force developed by the winding drum is in the order of 400 deca-Newtons, and this enables a safety-belt to be tightened in a satisfactory manner to apply it to the person to be protected. When the winding action of the drum is suddenly blocked, either at the ends of the travel of the belt or in an intermediate position, the forces of inertia applied to the balls 20 project them towards the sides 25 of the seats in the locating element and this causes them to be jammed between the flat floors of the linear grooves 7 in the drum and the outer cylindrical surface of the shouldered ring 21. This jamming causes the winding drum to be blocked while the tangential force applied to the drum in the direction indicated by the arrow 6, indicating the return of the winding drum towards its initial position, is insufficient to overcome the resistance due to the penetration of the balls 20 into the shouldered ring 21; however, as soon as this tangential force becomes high enough to overcome this resistance, the winding drum rotates in the direction indicated by the arrow 26, and each of the balls scores a separate groove in the shouldered ring so that the winding drum is enabled to return to its initial position thereby dissipating a considerable amount of energy and this ensures efficient shock-absorption.

We claim:

1. In a device for winding up an elongate flexible element, such as a vehicle safety belt, comprising a casing, an axle mounted in said casing and rotationally fast therewith, a hollow winding-drum rotatably mounted in said casing coaxial with and surrounding said axle, an annular piston positioned between said drum and axle and axially movable relative thereto between initial and final positions, an annular pressure chamber defined within said drum by said piston in said initial position thereof, a pyrotechnic charge for pressurising said pressure chamber with combustion gases therefrom to propel said piston axially along said drum and axle from said initial position, to said final position, first cooperable guide means on said piston and said drum, and second cooperable guide means on said piston and said axle, said first and second guide means being so arranged that said piston is rotationally fast with one of said drum and axle, and is movable along a helicoidal path relative to the other of said drum and axle, whereby axial displacement of the piston by the combustion gases causes said drum to be rotated for winding said flexible element on to said drum, the improvement which comprises the annular piston being formed by two annular half-pistons, one of said half-pistons cooperating through said first guide means with the drum, the other of said half-pistons cooperating through said second guide means with said shaft, and said half-pistons having means for interconnecting said half-pistons to move together.

2. The improvement of claim 1, wherein said interconnecting means is adapted to operate when said pyrotechnic charge is ignited, whereby said drum is able to rotate initially without said annular half-pistons being axially displaced.

3. The improvement of claim 2, wherein said half-pistons have opposed faces and said interconnecting means is constituted by substantially radial teeth formed on said opposed faces of the half-pistons which are adapted to engage each other when the pyrotechnic charge is ignited.

4. In a device for winding up an elongate flexible element, such as a vehicle safety belt, comprising a casing, an axle mounted in said casing and rotationally fast therewith, a hollow winding-drum rotatably mounted in said casing coaxial with and surrounding said axle, an annular piston positioned between said drum and axle and axially movable relative thereto between initial and final positions, an annular pressure chamber defined within said drum by said piston in said initial position thereof, a pyrotechnic charge for pressurising said pressure chamber with combustion gases therefrom to propel said piston axially along said drum and axle from said initial position, to said final position, first cooperable guide means on said piston and said drum, and second cooperable guide means on said piston and said axle, said first and second guide means being so arranged that said piston is rotationally fast with one of said drum and axle, and is movable along a helicoidal path relative to the other of said drum and axle, whereby axial displacement of the piston by the combustion gases causes said drum to be rotated for winding said flexible element on to said drum, the improvement which comprises a retaining mechanism interposed between said drum and said shaft, for opposing rotation of said drum relative to said shaft in a direction to unwind the flexible element therefrom and to move said piston from the said final position to said initial position thereof, after said pyrotechnic charge has been ignited.

5. The improvement of claim 4, wherein said retaining mechanism comprises at least one wedging element, and a portion fast with said drum or said shaft, said wedging elements being adapted to penetrate said portion to a predetermined depth.

6. The improvement of claim 5, wherein said wedging elements are balls having very high mechanical strength.

7. The improvement of claim 5 wherein said retaining mechanism comprises a plurality of wedging elements which are staggered longitudinally of said drum.

8. The improvement of claim 4, wherein said first or second guide means comprises at least one groove and said retaining mechanism comprises a wedging element accommodated in said groove.

9. The improvement of claim 5, wherein said drum has an interior surface with at least two longitudinally extending keying grooves in said interior surface, said wedging elements being fitted in said grooves and longitudinally staggered by at least one locating element which extends into said longitudinal grooves.

10. The improvement of claim 5, wherein said portion fast with said drum or shaft comprises a ring made of a deformable material.

* * * * *